US005120967A

United States Patent [19]

Cappelli et al.

[11] Patent Number: 5,120,967

[45] Date of Patent: Jun. 9, 1992

[54] APPARATUS FOR DIRECT MEASUREMENT OF DOSE ENHANCEMENT

[75] Inventors: John A. Cappelli, Malden, Mass.; Lester F. Lowe, Petersboro, N.H.; Steven D. Mittleman, Framingham, Mass.

[73] Assignee: The United States of America as represented by the Secretary of the Air Force, Washington, D.C.

[21] Appl. No.: 645,956

[22] Filed: Jan. 25, 1991

[51] Int. Cl.[5] ........................ H01J 47/02; G01T 1/185

[52] U.S. Cl. .................................. 250/385.1; 250/374

[58] Field of Search .............................. 250/385.1, 374

[56] References Cited

U.S. PATENT DOCUMENTS

| | | | |
|---|---|---|---|
| 4,300,050 | 11/1981 | Hizo et al. | 250/374 |
| 4,362,940 | 12/1982 | Almond | 250/374 |
| 4,427,890 | 1/1984 | Taumann | 250/385.1 |
| 4,514,633 | 4/1985 | Chamberlain | 250/374 |
| 4,583,020 | 4/1986 | Cliquet et al. | 313/93 |

FOREIGN PATENT DOCUMENTS

| | | | |
|---|---|---|---|
| 3542306 | 6/1987 | Fed. Rep. of Germany | 250/385.1 |
| 53-02182 | 12/1978 | Japan | 250/385.1 |
| 55-87069 | 7/1980 | Japan | 250/385.1 |

OTHER PUBLICATIONS

Kerris et al., "Experimental Determination of the Low Energy Component of Cobalt-60 Sources," IEEE Trans. Nucl. Sc., NS-32, 4356-4362 (Dec. 1985).

Frederickson et al., "Ionization, Secondary Emission, and Compton Currents at Gamma Irradiated Interfaces," IEEE Trans. Nucl. Sc., NS-18, 162-169 (Dec. 1971).

Wall et al., "Gamma Dose Distributions At and Near the Interface of Different Materials," IEEE Trans. Nucl. Sc., NS-17, 305-309 (Dec. 1970).

B. G. Basova, V. P. Zakharova, V. A. Korostylev, V. N. Nefedov, A. D. Rabinovich and D. K Ryazanov, "A Double Ionization Chamber for Studying Fission-Fragment Spectra."

Translated from *Pribory i Tekhnika Eksperimenta,* No. 4 (Jul.-Aug. 1975) pp. 46-49, [Copyright ©1976 Plenum Publishing Corporation].

L. S. Beller, "Small Back-To-Back Detector For Precise Comparison Of Fission And (n,α) Reaction Rates," *Nuclear Instruments and Methods,* vol. 92, No. 3 (1971) pp. 397-401, [Copyright ©1971 North-Holland Publishing Co.].

*Primary Examiner*—Constantine Hannaher
*Attorney, Agent, or Firm*—Stanton Collier; Donald J. Singer

[57] ABSTRACT

A dual cavity ionization chamber provides a means to measure dose enhancement factors under a wide range of conditions. The chamber can be calibrated to give an absolute dose reading for silicon, gallium arsenide, or any other material together with the associated enhancement factor.

20 Claims, 3 Drawing Sheets

APPARATUS FOR DIRECT MEASUREMENT OF DOSE ENHANCEMENT

STATEMENT OF GOVERNMENT INTEREST

The invention described herein may be manufactured and used by or for the Government for governmental purposes without the payment of any royalty thereon.

BACKGROUND OF THE INVENTION

The present invention relates to radiation measurement, and, in particular, to radiation measurement of dose enhancement in radiation facilities.

It has become increasingly clear in recent years that the conventional dosimetry methods used in testing electronic systems can lead to an underestimate of the dose received by irradiated piece parts. In typical cobalt-60 test facilities the magnitude of the errors can easily exceed a factor of two and in some cases a factor of five. This problem, which is now commonly referred to as dose enhancement, arises due to a fundamental assumption implicit in present day gamma and X-ray dosimetry methodology. The assumption is that the dimensions of the target material are large relative to the range of the energetic Compton electrons and photoelectrons produced by the incident high energy gamma photons. Under this assumption transport of the secondary electrons away from the point where they are produced is neglected. This greatly simplifies the interpretation of dosimetry measurements and calculations.

The dimensions of modern microelectronic devices are such that the basic assumption underlying common dosimetry techniques, i.e., zero secondary electron transport, is almost never justified. The result is the possibility of the substantial errors previously mentioned.

To compound the problem it turns out that the magnitude of the dose enhancement is very sensitive to the gamma spectrum at the point of interest. This spectrum is very different from that emitted by the source due to Compton scattering within the test facility. The scattered spectrum is also quite variable from one test facility to another. Large variations are even possible in the same facility due to changes in supporting structures or shielding materials in the immediate vicinity of the object under test.

The direct calculation of the enhancement is difficult for two reasons: because of scatter it requires a determination of the gamma photon spectrum at the point of interest (a photon transport problem), followed by a second calculation of the energy deposited by the photon induced secondary electrons in the target structure (an electron transport problem). For the complex three dimensional geometries commonly encountered, Monte Carlo computations are generally required in both cases. Fortunately, improvements in transport codes in recent years have enabled calculations to be made for even the complex multilayered structures typically encountered in device testing. There are additional problems, however, in the routine application of the computational approach.

Accurate input data required to perform the calculations is likely to be unavailable. The photon transport part of the calculation in a given test facility requires data on the exact positions, shapes and compositions of the structures surrounding the test object. The electron transport part of the calculation requires information on the microscopic structural details of the irradiated device or component. Inaccurate information concerning either or both of these areas can render the transport calculations inaccurate.

SUMMARY OF THE INVENTION

A dual cavity ionization chamber is used for measuring radiation enhancement in a radiation facility.

The dual cavity ionization chamber has three electrode plates separated by two non-conducting spacers having cavity holes therein. Two non-conducting end covers are placed about the above and held in place by two clamp plates. Electrical connection is made separately to each electrode plate. The electrode plates are made of aluminum, for example. The high atomic number material is simulated by placing gold foil, for example, on one side of the interior electrode plate. The foil may or may not face the incoming radiation. Other materials may be used as determined by need such as gold, silicon, aluminum and gallium arsenide.

One object of the present invention is to provide a means to measure the enhancement factor wherein this can be derived directly from the chamber measurements without recourse to reference data, experimental or computational data that may be difficult to obtain.

Another object of the present invention is to provide a means to simulate many different conditions encountered in a component under test such as to detect the dependence of the dose on sample orientation.

Another object of the present invention is to provide means to determine dose enhancement factor having high spatial resolution so that energy deposition in simulated multilayer structures can be explored.

Another object of the present invention is to provide means to measure dose enhancement factor which can readily detect any inadvertent changes in the irradiation environment that might significantly alter the dose enhancement factor in vulnerable devices.

These and many other objects and advantages of the present invention will be readily apparent to one skilled in the pertinent art from the following detailed description of a preferred embodiment of the invention and the related drawings.

DESCRIPTION OF THE PREFERRED EMBODIMENT

Figure 3:
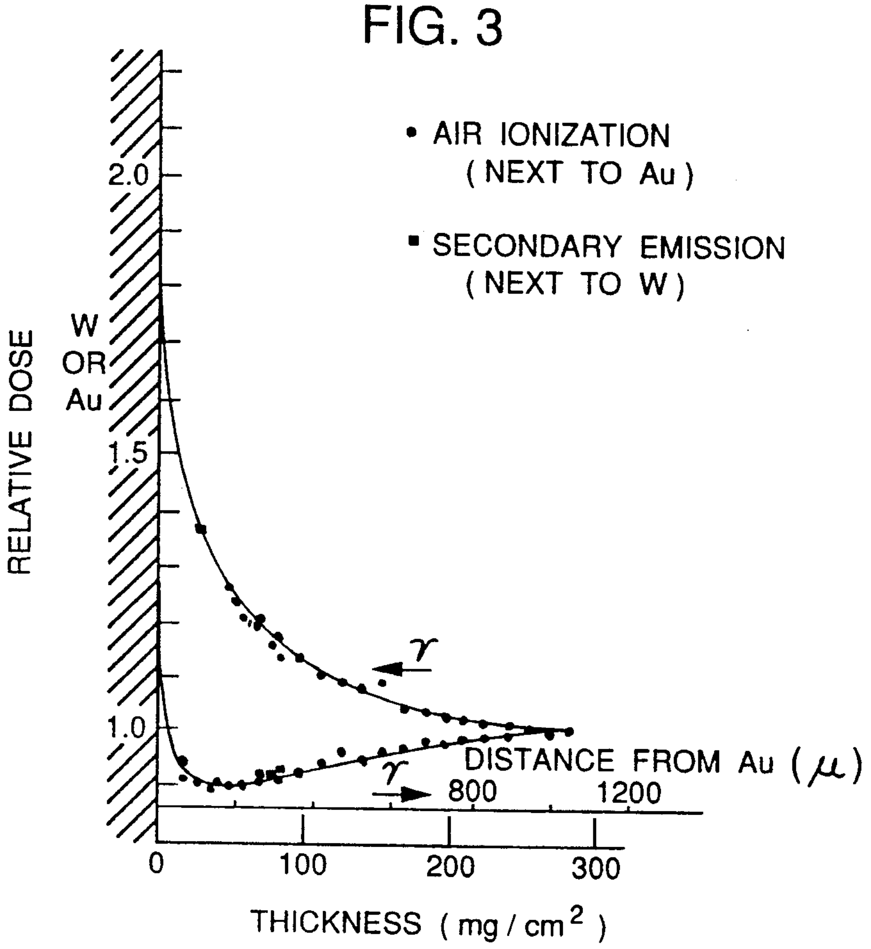
FIG. 3 is a graph of dose versus thickness in a multilayered structure.

The basic nature of the dose enhancement phenomenon for a high atomic material next to a lower atomic number material is illustrated by the experimental data in FIG. 3. As will be shown, the dose enhancement factors can be altered by a factor of two, for example, as a result of Compton scatter from relatively small amounts of low or high atomic number materials next to the target.

The high atomic number material is gold (or tungsten) and aluminum simulates silicon. The upper curve is for the case where the gamma rays originating at the right penetrate the low atomic number aluminum before reaching the gold and the lower curve is for the case where the beam enters the gold layer first. The experimental points were obtained using ionization chambers in one case and secondary emissions in the other. The quantity indicated on the vertical axis is the dose relative to that in a silicon equivalent dosimeter under so called electronic equilibrium conditions. In fact, it can be seen that it is not until a distance of 1000 micrometers from the boundary is reached that the relative dose approaches 1.0. At the boundary, the relative dose for the upper curve exceeds a factor of two. The lower curve for the reverse beam direction starts at a value of about 1.5, rapidly drops to a value less than 0.9, and gradually rises until it reaches the equilibrium point.

The quality of the gamma spectrum used in collecting the data shown in FIG. 3 is important because it can markedly influence the magnitude of the dose enhancement. It was found in that the incident gamma spectrum employed to collect the data shown in FIG. 3 consisted of about 74% primary Co-60 photons and the remainder was lower energy Compton scattered photons. This would be fairly typical for most gamma facilities in current use.

The significance for modern devices such as integrated circuits (ICs) is clear given the fact that critical device dimensions (e.g. gate oxides) can be less than 0.1 micrometers thick and that gold is common in device packages. Although the gold in FIG. 3 was an equilibrium thickness, later observations showed that even micrometer layers produced a marked effect at Co-60 energies.

Figure 4:
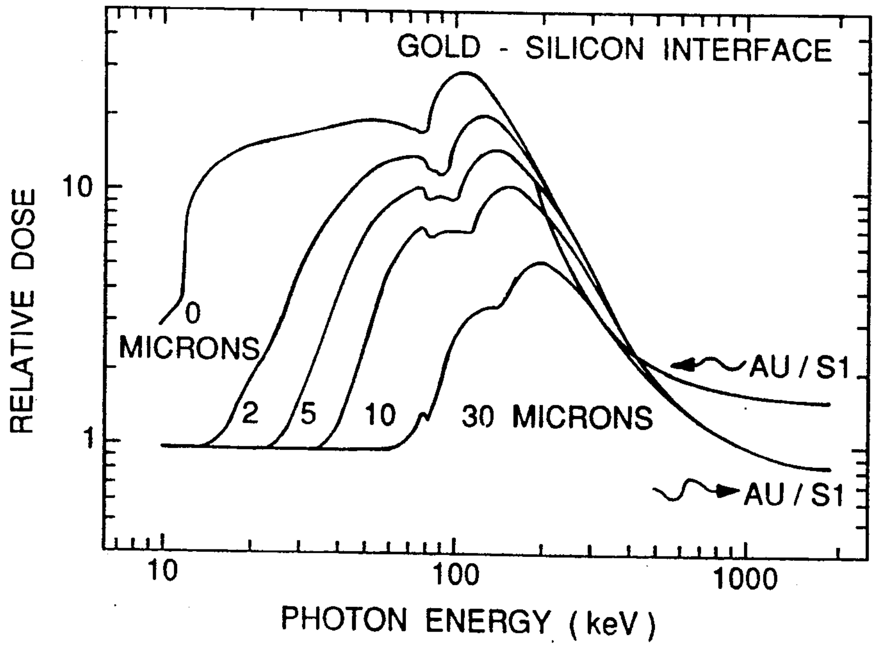
FIG. 4 is a graph of dose versus photon energy in a multi-layered structure.

It was also determined that the enhancement near the interface was extremely sensitive to the presence of scattered radiation and could greatly exceed the factor of two found in the initial measurements. The reason becomes clear in the FIG. 4 which shows the result of extensive Monte Carlo calculations of the enhancement factor as a function of the incident photon energy and distance from the interface. It can be seen that the maximum enhancement exceeds a factor of 30 and occurs at a photon energy of about 150 KeV. It turns out that the scattered gamma ray spectrum in typical cobalt facilities peaks at about this energy and that 25 to 50% of the photons incident upon a target will be from this scattered component. FIG. 4 makes clear the reason for the sensitivity of the enhancement factor to the Compton scatter. The article by Burke et al., The Direct Measurement of Dose Enhancement in Gamma Test Facilities, IEEE Transactions on Nuclear Science, Vol. 36, No. 6, December 1989, pp 1890–1895, is incorporated by reference.

Figure 1:
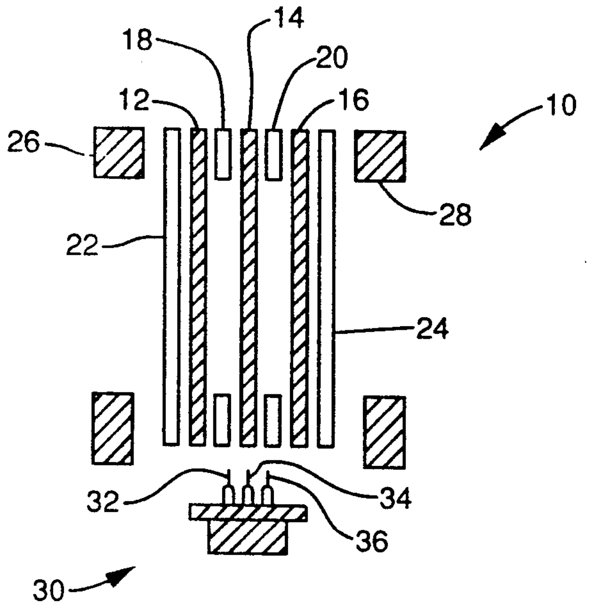
FIG. 1 is an exploded cross section of the dual cavity ionization chamber of the present invention.
Figure 2A:
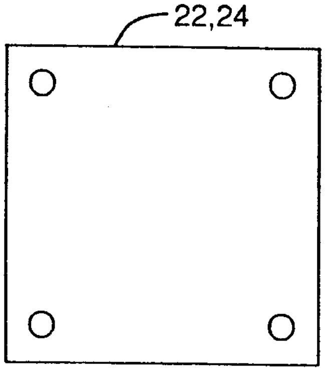
FIGS. 2A to 2E illustrate the shapes of elements of the dual cavity ionization chamber of the present invention.
Figure 2B:
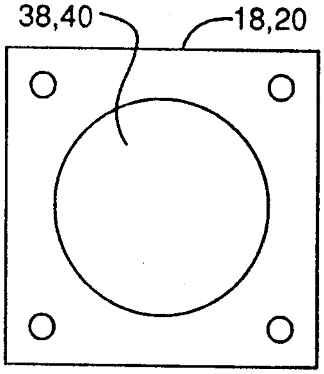

The present invention shown in FIGS. 1 and 2A to 2E employs parallel plate geometry with two air cavities 4.5 cm in diameter FIG. 2B, and walls 0.1 cm apart. The invention permits the wall materials to be varied according to the particular problem of interest.

Figure 5:
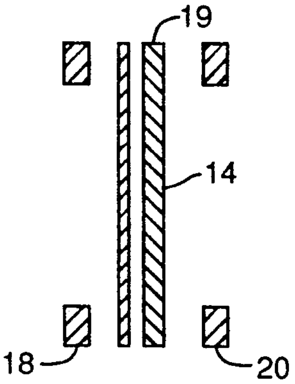
FIG. 5 illustrates addition of foil to interior electrode of the dual cavity ionization chamber of the present invention.

Referring to FIG. 1, a dual cavity ionization chamber 10 is shown having three electrodes 12, 14 and 16 of three 0.1 cm thick aluminum plates separated by polystyrene spacers 18 and 20 of the same thickness. A 50 micrometer gold foil 19, FIG. 5, is stretched over the interior of the inner electrode 14 in one of the cavities. Solid end covers 22 and 24 of 0.1 cm thick polystyrene are used to isolate the electrodes from the external environment and clamp plates 26 and 28 hold the above together by means of insulated bolts, not shown. Each electrode is connected to an electric wire which is connected to electrical means to measure the ionization current therefrom. An electrical connector 30 is shown having three wires 32, 34 and 36 that are connected to each electrode by mechanical pressure.

Figure 6A:
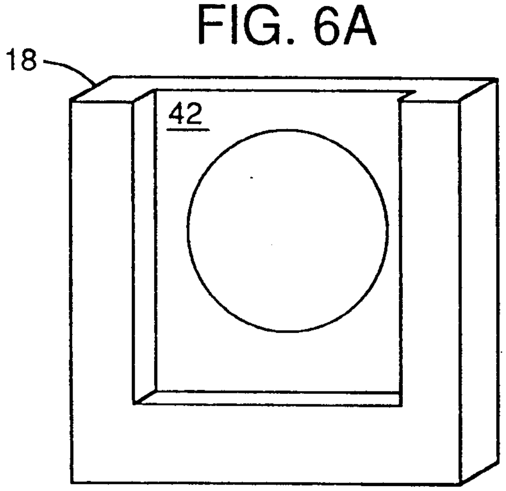
FIG. 6 illustrates a slotted spacer with a frame insert.
Figure 6B:
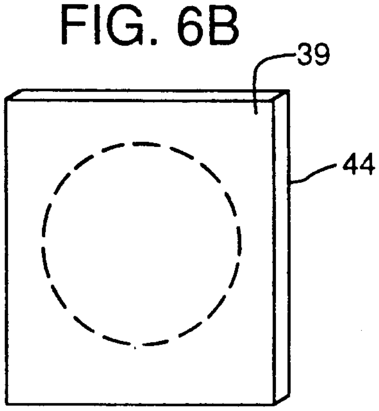

Another feature would be means to allow a foil 39, FIG. 6, to be changed without disassembling the chamber 10. For example, a slot 42 could be cut into the spacer 18 wherein the slot 42 would face the interior electrode 14. The foil 39 would be mounted on a frame 44 that could be inserted into the slot 42.

Figure 2C:
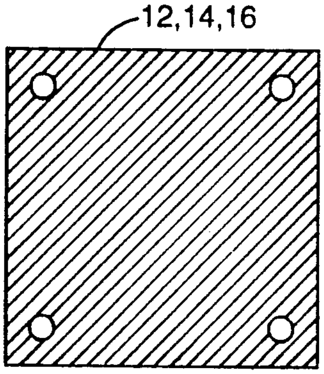
Figure 2D:
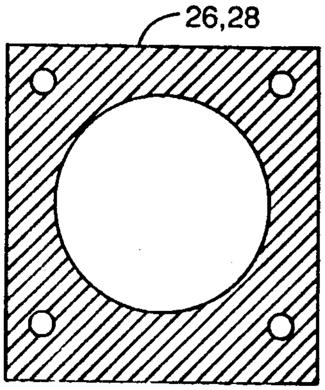
Figure 2E:
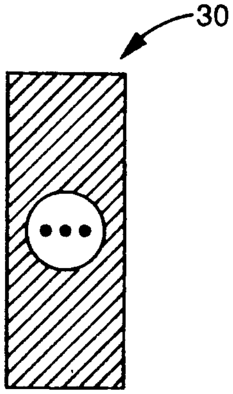

Referring to FIGS. 2A to 2E, critical dimensions are the diameters of cavity holes 38 and 40 in the spacers (4.5 cm) FIG. 2B, their thicknesses (0.1 cm), and the thickness of the electrodes (0.1 cm for Al and 0.04 cm for Cu)FIG. 2C. The spacers 18 and 20 and the end covers 22 and 24, FIG. 2A, are 6.25 cm square and the end plates, FIG. 2D, 7.5 by 6.25 by 0.6 cm.

The basic measuring circuit measures voltages applied and current flowing from each electrode. It includes a potentiometer and switching circuit for varying the applied potential of either cavity between a few tenths of a volt to ±60 volts.

Calculations based upon well established relationships on ion chamber performance show that a chamber of this size should have a collection efficiency of greater than 99% at an exposure rate of 100R/s. The effect of humidity on response amounts to less than one percent for changes in relative humidity ranging between 5 to 95%. The dual cavity ionization chamber 10 yielded excellent plateau curves for all material and voltage polarity combinations. In obtaining the data readings were taken over a 10 to 60 volt range. The relative standard deviation of the dose enhancement factors obtained over this range typically did not vary by more than 2% which means that applied bias does not need to be rigorously controlled.

A factor that is not often mentioned with regard to the operation of ionization chambers of the type described here is the appearance of polarity effects, i.e., changes in the collected current as a function of the polarity of the applied voltage. A number of factors can contribute to this effect. To eliminate possible errors from this source the readings obtained under positive and negative bias were averaged. If this is not done the enhancement factors may vary by ±5% of those reported here.

The dose enhancement factor was directly obtained by measuring the ratio between the ionization current in the all aluminum cavity chamber and the mixed aluminum-gold foil cavity chamber at the same exposure position. No other information is required such as an effective energy from an energy response curve followed by an estimate of the enhancement from Monte Carlo calculations of the enhancement factor as a function of energy. At the present time Monte Carlo calculations of dose enhancement versus photon energy are only available for gold next to silicon and gold next to polyethylene. This restricts the application of previous apparatus to those material combinations. The direct measurement technique does not require data from calculations and can be applied to any combination of materials which are electrically conducting. Also, unlike a single cavity chamber, only one experimental setup of the dual cavity is required. The dual cavity ionization chamber 10 readings needed to arrive at the ratio are obtained directly without changing the chamber configuration or position.

After insuring that the observed currents accurately reflected cavity ionization and were not contaminated with induced "Compton currents" or other stray sources, the dual cavity ionization chamber 10 was compared with calibrated Victoreen R chambers and found to yield a current within 10% of a calculation based upon the nominal chamber dimensions. It was clear that with calibration it was possible to use the dual chamber as a "silicon equivalent dosimeter."

Figure 7:
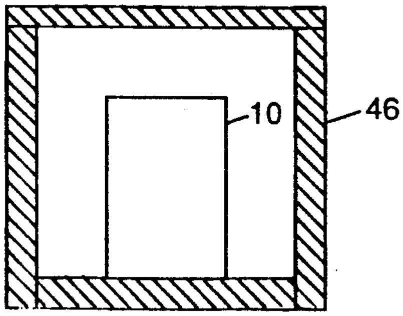
FIG. 7 illustrates the dual cavity ionization chamber surrounded by scatter medium.

The dual cavity ionization chamber 10 was then used in the configuration required for measuring the enhancement at a gold-aluminum interface. In this configuration one of the cavities has a gold foil stretched over the interior aluminum electrode 14 as previously described. It has been found that surrounding a chamber 10 with paraffin would increase the Compton scatter sufficiently to markedly increase the dose enhancement factor. FIG. 7 illustrates the chamber 10 surrounded by a housing 46 of a desired material. When lead was substituted for the paraffin the enhancement factor was noticeably reduced. In the experiments with the dual cavity ionization chamber 10, exposures were made with paraffin, lead and at normal exposure conditions. The results are shown in the Table 1.

TABLE 1

| Scatter Medium | Orientation | DEF |
|---|---|---|
| Air | Al→Au | 2.03 |
| Air | Au→Al | 1.51 |
| Wax | Al→Au | 2.39 |
| Wax | Au→Al | 1.89 |
| Lead | Al→Au | 1.56 |
| Lead | Au→Al | 1.03 |
| Air | Cu→Au | 1.72 |
| Air | Au→Cu | 1.46 |
| Wax | Cu→Au | 1.91 |
| Wax | Au→Cu | 1.59 |
| Lead | Cu→Au | 1.36 |
| Lead | Au→Cu | 1.13 |

The scatter medium is shown in the first column (e.g. Air for normal exposure), the orientation of the wall materials in the second column (e.g. Al→Au means that the Co-60 photons penetrate the aluminum before reaching the interface with the gold), and the last column gives the observed enhancement factor.

The dose enhancement factor for the Al→Au orientation was found to be 2.03. This is a typical value for the case where the photons approach the interface from the low atomic number side. Note that when the beam direction is reversed the dose enhancement factor is reduced by about 25%. This demonstrates the importance of the orientation effect which has frequently been ignored in piece part testing. The magnitude of the orientation effect varies with scatter conditions and distance from the interface. It is readily detected with a dual chamber of the type described here.

The orientation effect will be most important when the primary photons impinge upon the target from one direction. In the case of cylindrically symmetric sources e.g. gammacells, or in certain configurations encountered in water pools, the primary photons and the associated Compton scattered photons penetrate the interface from opposing directions. This tends to reduce, and in the case of perfect symmetry remove, the dependence on orientation. The dose enhancement, however, remains, yielding a value representing an average over the two extremes found in a directional source.

The influence of enhancing the Compton scatter is evident in the next pair of readings where the scatter medium is 10 cm of paraffin wax. The enhancement factors are observed to increase markedly for both beam directions. The assumption that the "high energy" Co-60 photons should be little influenced by this relatively small amount of low atomic number material is misleading. In a real test situation the material might be plastic, wood or water.

The enhancement factors are reduced by adding a high atomic number filter to reduce the amount of Compton scatter but the asymmmetry remains. Note that with these particular combinations of scatter materials the difference between the lowest and highest dose enhancement factor is a factor of two.

An alternative way of comparing variations in dose enhancement is to compare changes in the enhanced dose only, i.e., subtract 1.0 from the usual dose enhancement factor. A change in a DEF from 2.0 to 1.5 then represents a 50% rather than a 25% change in enhancement.

It is significant that all of these readings were taken in exactly the same position in a concrete shielded exposure facility. Only relatively small changes were made in the scatter environment by adding wax bricks or small amounts of lead shielding. Such materials can frequently find their way into test facilities of this sort without attracting much concern. Much larger changes can occur if the target is moved next to large sources of scatter such as the shielding walls. This potential for inadvertently changing the exposure conditions is an important reason for employing the dual cavity ionization chamber 10 of the present invention.

In addition to studies with the Au/Al chamber a series of experiments were carried out with an all copper dual cavity ionization chamber 10 (rather than aluminum), one cavity of which contained a gold foil. In this case the combination is closely simulating the ionization dose enhancement conditions at a gold-gallium arsenide interface.

As can be seen from the Table 1, the enhancement factors are only slightly lower than the Au/Al case. The Compton scatter, enhanced by the paraffin, strongly influences the result. In this case the experimental results when a lead filter is present are in excellent agreement with calculations. The calculations were done for pure Co-60 photons and the lead filter brings the incident spectrum close to that condition. The calculated values were 1.35 and 1.16 and the measured values are 1.36 and 1.13.

One of the interesting capabilities of the dual chamber described is that it can be used to determine the enhancement at any distance from the interface by simply adding an intervening foil. This was done for aluminum and yielded results corresponding to those given in FIG. 3. Any complex multilayer structure can be thus be simulated provided that the outer layers are conducting.

Clearly, many modifications and variations of the present invention are possible in light of the above teachings and it is therefore understood, that within the inventive scope of the inventive concept, the invention may be practiced otherwise than specifically claimed.

What is claimed is:

1. A dual cavity ionization chamber, said dual cavity ionization chamber comprising:

an interior electrode, said interior electrode being a sheet of conducting material;

a pair of spacers, said spacers being positioned on opposite sides of said interior electrode, said spacers having cavity holes therein, each spacer being a sheet of non-conducting material;

a pair of outer electrodes, said outer electrodes being positioned on the spacers opposite the interior electrode, said outer electrodes being a sheet of conducting material;

a pair of end covers, said end covers being positioned on the outer electrodes opposite to said spacers, said end covers being made of a sheet of non-conducting material;

a pair of clamp plates, said clamp plates attached about said end covers, said outer electrodes, said spacers and said interior electrode, said clamp plates having holes therein similar to the holes in said spacers; and electrical means attached said interior electrode and said outer electrodes for conducting current therefrom, a pair of cavities being formed by said electrodes and said spacers.

2. A dual cavity ionization chamber as defined in claim 1 wherein said electrodes are made of a lower atomic number material.

3. A dual cavity ionization chamber as defined in claim 2 wherein said material is aluminum.

4. A dual cavity ionization chamber as defined in claim 3 wherein said electrodes are about 0.1 centimeters in thickness.

5. A dual cavity ionization chamber as defined in claim 2 wherein said material is copper.

6. A dual cavity ionization chamber as defined in claim 5 wherein said copper sheet is about 0.04 centimeters thick.

7. A dual cavity ionization chamber as defined in claim 1 further including a sheet of material for simulating other materials for dose enhancement measurements.

8. A dual cavity ionization chamber as defined in claim 7 wherein said materials are gold, silicon, aluminum, and gallium arsenide.

9. A dual cavity ionization chamber as defined in claim 7 further including means for allowing the change of said sheet.

10. A dual cavity ionization chamber as defined in claim 1 further including a sheet of high atomic number material placed on said interior electrode.

11. A dual cavity ionization chamber as defined in claim 10 wherein said material is gold.

12. A dual cavity ionization chamber as defined in claim 11 wherein the gold sheet is about 50 micrometers in thickness.

13. A dual cavity ionization chamber as defined in claim 10 further including means for allowing the change of said sheet.

14. A dual cavity ionization chamber as defined in claim 1 wherein the cavities formed in said dual cavity ionization chamber have the dimensions of about 4.5 centimeters in diameter and a height of about 0.1 centimeters.

15. A dual cavity ionization chamber as defined in claim 1 wherein a voltage applied to the cavity is in a range from about 1 volt to about 60 volts.

16. A dual cavity ionization chamber as defined in claim 1 wherein the chamber has a collection efficiency of greater than 99% at an exposure of 100 rads per second from a cobalt 60 source.

17. A dual cavity ionization chamber as defined in claim 1 further including a scatter medium about said dual cavity ionization chamber.

18. A dual cavity ionization chamber as defined in claim 17 wherein said scatter medium is selected from the group of material consisting of paraffin, lead, and water.

19. A process of measuring a dose enhancement factor in a radiation beam of gamma rays, said process comprising the steps of:

positioning a dual cavity ionization chamber in a predetermined position within a radiation field, said dual cavity ionization chamber having a sheet of high atomic material in contact with an interior electrode being of a low atomic material;

inputting a radiation beam into said dual cavity ionization chamber;

measuring an ionization current flowing from a first cavity;

measuring an ionization current flowing from a second cavity, said second cavity having said high atomic material therein; and forming the dose enhancement factor by dividing the ionization current from said first cavity by the ionization current from said second cavity.

20. A process as defined in claim 19 wherein a scatter medium is placed about said dual cavity ionization chamber.

* * * * *